United States Patent [19]
Dabrowka

[11] 3,924,708
[45] Dec. 9, 1975

[54] LUBRICATING AND DRAINING DEVICE

[75] Inventor: Stanislav Pawel Dabrowka, Leeds, England

[73] Assignee: Lucas Aerospace Limited, Birmingham, England

[22] Filed: Jan. 25, 1974

[21] Appl. No.: 436,810

[30] Foreign Application Priority Data
Jan. 25, 1973 United Kingdom.................. 3825/73

[52] U.S. Cl............................................. 184/105 R
[51] Int. Cl.$^2$ ........................................ F01M 11/04
[58] Field of Search......... 184/105 R, 1 R; 137/212, 137/588; 222/400.7; 141/311, 383

[56] References Cited
UNITED STATES PATENTS

| | | | |
|---|---|---|---|
| 2,314,374 | 3/1943 | Sundholm ...................... | 184/105 R |
| 2,543,200 | 2/1951 | Rich et al........................ | 184/105 R |
| 3,596,809 | 8/1971 | Taubenheim .................. | 137/212 X |
| 3,596,810 | 8/1971 | Taubenheim .................. | 137/212 X |
| 3,720,355 | 3/1973 | Johnston.......................... | 222/400.7 |

*Primary Examiner*—Richard J. Apley
*Assistant Examiner*—William R. Browne
*Attorney, Agent, or Firm*—Holman & Stern

[57] ABSTRACT

A mechanical device including a housing containing a mechanism requiring lubrication. The housing is provided with a coupling unit defining a pair of passages one of which communicating with the interior of the housing at high and low levels respectively. A coupling member is engageable with the coupling unit and in so doing valves within the coupling unit are operated to permit lubricant to flow into the housing through the passage at the lower level and out of the housing through the passage at the higher level.

5 Claims, 4 Drawing Figures

LUBRICATING AND DRAINING DEVICE

This invention relates to a mechanical device of the kind comprising a housing containing a mechanism, the housing also containing lubricant which needs to be maintained at a predetermined level for lubricating the mechanism.

In some practical installations, the device is positioned in a position in which it is difficult to provide both a normal drain orifice to enable the housing to be drained of lubricant and a filling orifice positioned so that the housing may be filled up to the desired level.

The object of the invention is to provide such a device in a simple and convenient form.

According to the invention, a device of the kind specified comprises a coupling unit mounted on the housing, a pair of passages defined in the coupling unit, a conduit which is in communication with one of said passages and which terminates within the housing substantially at said predetermined level, the other passage communicating with the interior of the housing, the arrangement being such that a coupling member may be connected to the coupling unit, said coupling member including a lubricant channel through which lubricant may be supplied to said other passage, and also a drain channel for communication with said one passage, the arrangement being such that fresh lubricant can be supplied to the housing, the surplus lubricant leaving said housing through said conduit and said one passage.

According to a further feature of the invention, said coupling unit includes valve means for closing said passages when the coupling member is not connected thereto.

One example of a device in accordance with the invention will now be described with reference to the accompanying drawings in which.

Figure 1:
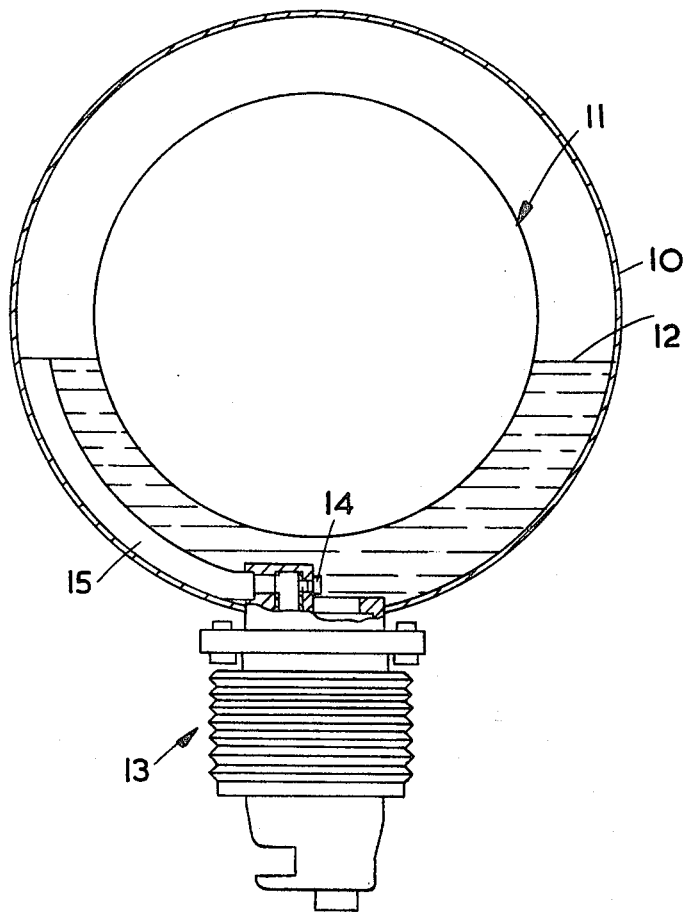
FIG. 1 is a sectional side elevation through the device.

With reference to FIG. 1 the device comprises a cylindrical housing 10 in which is located a mechanism 11, including in the particular example, a speed reduction unit. The device 10 comprises an air turbine starter for a gas turbine engine, and it is positioned within the nose cone of the engine and therefore is relatively inaccessible. The gear reduction mechanism 11 requires to be lubricated and conveniently when the mechanism is at rest, the lubricant level within the housing 10 is indicated at 12. When the mechanism is in use, the lubricant level is reduced since the lubricant is displaced to other cavities within the device, and moreover, a certain quantity of the lubricant is lost when the device is in use.

The location of the device makes it extremely difficult to provide a drain orifice and also a filling orifice, it being appreciated that these two orifices must be located substantially at 90° relative to each other if an indication of overflow from the filling orifice is to be regarded as indicating that the lubricant level is the desired height.

In order to overcome this difficulty, a coupling unit 13 is mounted at the position which would normally be occupied by the drain orifice. The coupling unit as shown in FIG. 1 includes a passage 14 which communicates with a conduit 15 located within the housing, and having its open end terminating at the desired level of lubricant. The coupling unit is shown in greater detail in FIGS. 2 and 3, and the various parts of the coupling unit in these two figures are in the positions which they occupy when the device is in use.

Figure 2:
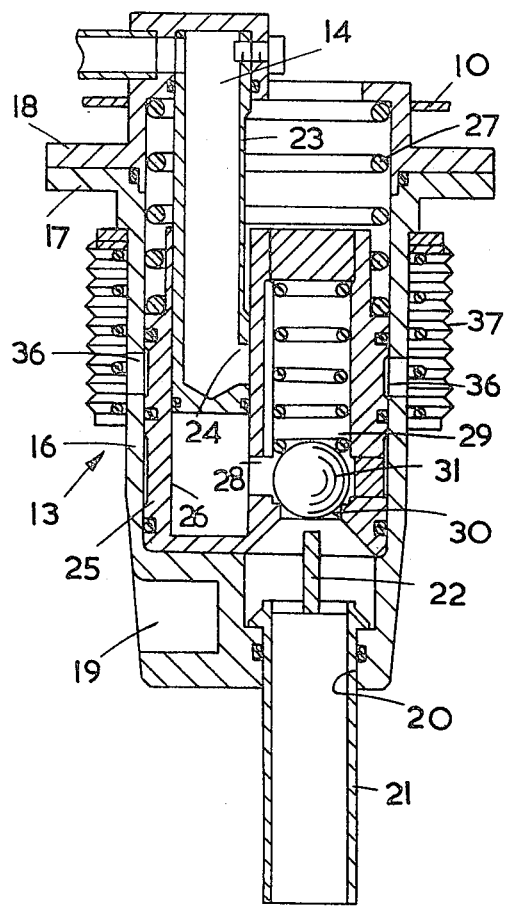
FIG. 2 is a sectional side elevation to an enlarged scale of the coupling unit of the device.
Figures 3, 4, 5:
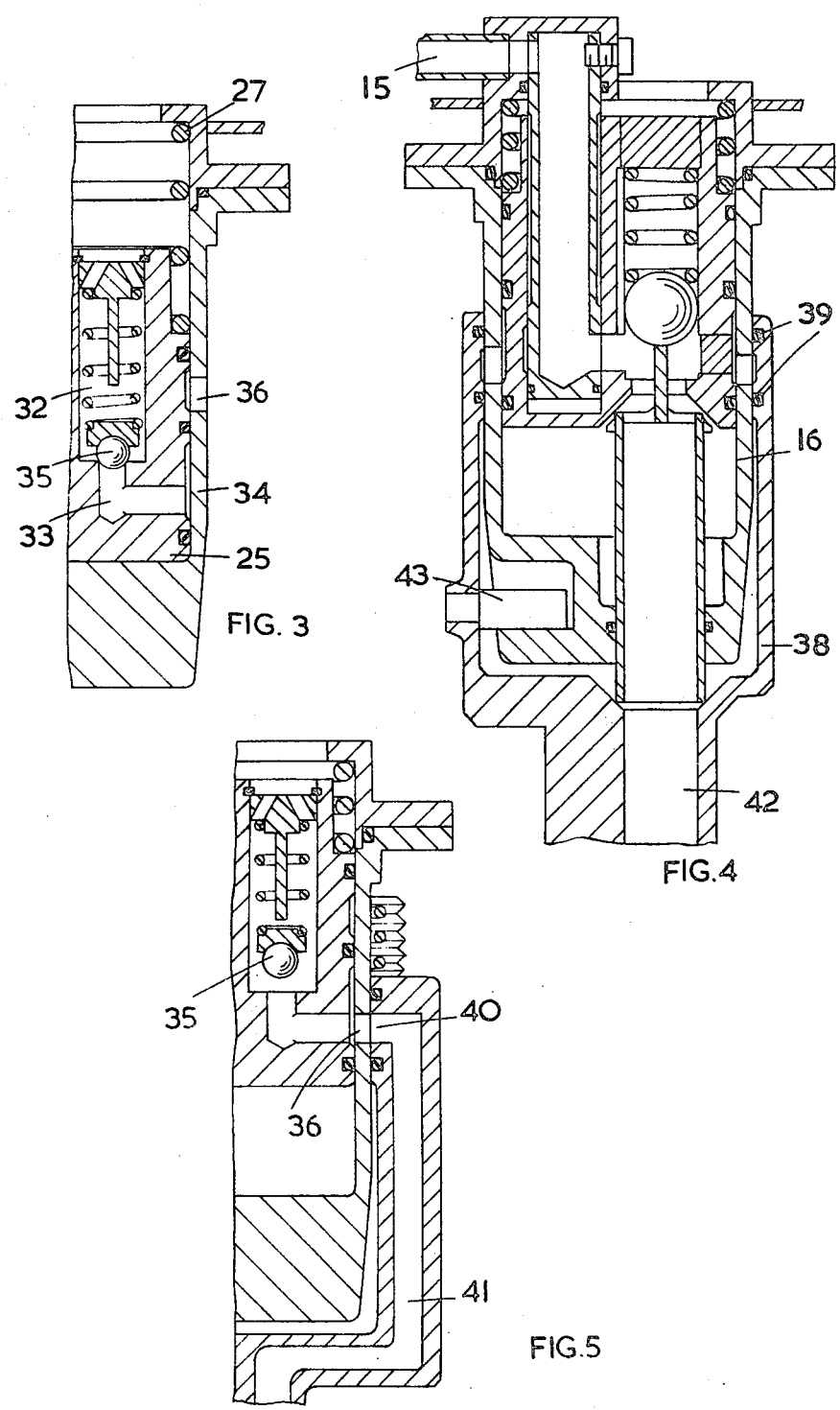
FIG. 3 is a part section of the coupling unit taken at a different angular position.
FIGS. 4 and 5 are views similar to FIGS. 2 and 3, but showing the coupling unit connected to a coupling member and with the various parts of the coupling in an operative position.

Referring to FIGS. 2 and 3, the coupling unit 13 comprises a tubular casing 16 having at one end a flange 17 whereby it can be mounted upon a complimentary flange 18 carried by a part which is secured to the wall of the housing 10. The casing at its other end defines a bayonet slot 19 and formed in this end wall of the casing is an aperture 20 in which is slidably accomodated a tubular element 21.

At its end disposed within the casing 16, the tubular element 21 is provided with a circumferential flange which prevents the element falling from the casing. In addition, the element has a projection 22 which extends towards the housing 10.

The passage 14 is constituted by a tube 23 having a closed end and which extends into the casing. The tube is provided with a lateral port 24, and the axis of the tube whilst being parallel to the axis of the casing 16 is offset relative thereto.

Slidably mounted within the casing is a plunger 25, and this defines a bore 26 in which the tube 23 is accommodated. The plunger is spring loaded by means of a coiled compression spring 27 to the lowermost end of the interior of the casing, and in this position, the end wall of the plunger abuts against an end wall of the casing. The passage 26 is provided with a port 28 for registration as will be described, with the port 24 when the plunger is moved against the action of the spring 27. The port 28 communicates with a cavity 29 formed in the plunger, and at one end the cavity is closed whilst at its other end there is defined an opening 30. Moreover, located within the cavity is a spring loaded ball 31 which closes the opening 30.

With reference now to FIG. 3, the plunger 25 is provided with a further cavity 32, from one end of which extends a passage 33 extending to a port 34 formed in the side wall of the plunger. The port 34 communicates with a circumferential groove formed in the exterior wall of the plunger 25. The passage 33 is closed by a further spring loaded ball 35 and the other end of the cavity 32 is open to the upper part of the interior of the casing, this part constituting a passage communicating with the interior of the housing 10.

Formed in the wall of the casing 16 are a plurality of circumferentially spaced ports 36 and these are normally closed as will be seen in FIGS. 2 and 3, by the plunger. Moreover, the ports 36 are protected against the ingress of dirt by means of a resilient gaiter 37. In FIGS. 2 and 3 it will be observed that no lubricant can flow from the casing 10 since the passage 14 is effectively closed by the plunger covering the port 24, and also by the fact that the ball 31 is closing the opening 30. The upper portion of the chamber defined by the casing, is effectively sealed by means of the ball 35, and the circumferential groove in this position of the plunger, is covered by the wall of the casing.

When it is desired to check the lubricant level in the housing 10, or alternatively change the lubricant, a coupling member 38 which is engaged about the periphery of the casing 16. The coupling member is of cup shaped form, and is close fitting about the casing 16. Adjacent its upper end there are provided a pair of spaced sealing members 39 and as shown in FIG. 5, intermediate these sealing members there is provided a port 40 which communicates with a lubricant supply passage 41 formed in the wall of the cup shaped member. The passage 41 in use, is connected to a source of clean lubricant. Extending from the base wall of the cup shaped member 38 is a drain passage 42, and the interior wall of the member 38 is provided with a pin 43 for engagement in the bayonet slot 19.

When the coupling member is engaged about the casing, axial movement of the coupling member firstly effects displacement of the tube 21. The tube 21 thus forms an extension of the passage 42 and as the coupling unit is moved axially, the projection 22 lifts the ball 31 from its seating. Continued movement of the coupling member brings the end of the tube 21 into engagement with the plunger, and the latter is moved against the action of the spring 27. In addition, the rim of the coupling member effects displacement of the gaiter 37. When the coupling member is properly engaged with the casing 16, as shown in FIG. 4, the ports 24 and 28 are aligned with each other, and the ball 31 having been lifted from its seating, a flow of lubricant may take place between the conduit 15 to the pasage 42. In addition, the port 40 in the coupling member is in alignment with the ports 36 in the casing, and the latter also communicates with the circumferential groove formed in the wall of the plunger, and from which extends the port 34. As shown in FIG. 5 when lubricant under pressure is supplied through the passage 41, the ball 35 is lifted from its seating to allow flow of lubricant into the housing 10. As the level of lubricant in the housing 10 attains the level 12, surplus lubricant will flow through the conduit 15 and into the passage 42 of the coupling member. The flow of lubricant may be maintained until in effect all the lubricant within the housing 10 has been changed, or alternatively it may be continued only until surplus lubricant flows through the conduit 15.

When the coupling member is disconnected from the coupling unit the various parts assume the positions shown in FIGS. 2 and 3, and the housing 10 is then effectively sealed.

I claim:

1. A mechanical device of the kind comprising a housing, mechanism within the housing, said housing in use containing lubricant for lubricating the mechanism, a coupling unit mounted in the housing below the desired level of lubricant within the housing, said coupling unit having first and second passages defined therein, a conduit positioned within the housing, said conduit at one end being connected to the first passage within the coupling unit and the other end of said conduit terminating at the desired level of lubricant within the housing. the second passage within the coupling unit communicating with the interior of the housing, said coupling unit comprising a hollow casing, a tube having a wall extending within the casing said tube defining part of said first passage, means closing the end of said tube within the casing, a lateral port formed in the wall of said tube, a plunger slidable within said casing, said plunger defining a bore in which said tube is located, resilient means biasing the plunger within the casing and in a direction away from the housing, a lateral port formed in said bore, said lateral ports being brought into register when the plunger is moved against the action of the resilient means, a cavity defined in said plunger, said cavity opening at one end to said housing and forming part of said second passage, a port formed in the peripheral wall of the plunger, said port communicating with said cavity, a further port formed in the wall of said casing, said ports being brought into communication with each during movement of the plunger against the action of said resilient means.

2. A mechanical device according to claim 1 including a coupling member shaped for engagement around said casing of the coupling unit and movable axially thereon into an engaged position, means for detachably retaining the coupling member in the engaged position on the casing, first and second passage means defined in the coupling member, said second passage means when the coupling member is in said engaged position communicating with said further port, an element movable in the coupling unit and projecting from the coupling unit for engagement by the coupling member as the coupling member is moved to said engaged position, said element acting to effect movement of the plunger against the action of the resilient means during engagement of the coupling member and the coupling unit, said element being of hollow form and acting to place said first passage means in communication with said lateral port in the bore of the plunger.

3. A mechanical device according to claim 2 including a further cavity defined in the plunger, a drilling through which said further cavity communicates with said lateral port in said bore, an opening in the plunger from said cavity, a seating defined about said opening, a spring loaded ball valve housed in the cavity for co-operation with said seating to define a non return valve, said non-return valve being positioned intermediate said drilling and said opening, said opening registering with the interior of said tubular element during movement of the coupling member to said engaged position, a projection defined on said tubular element, said projection acting to lift the ball from its seating to permit flow of lubricant through said first passage from said first passage means in the coupling member.

4. A mechanical device according to claim 3 including a non return valve in said first mentioned cavity, said non return valve including a valve element and a seating, the valve element being lifted from the seating by flow of lubricant through said second passage means.

5. A device as claimed in claim 4 including a resilient gaiter which surrounds the casing which covers the port in the wall of the casing when the coupling member is not engaged with the coupling unit, said gaiter being displaced during engagement of the coupling member with the coupling unit.

* * * * *